(12) United States Patent
Genevaux et al.

(10) Patent No.: US 11,867,607 B2
(45) Date of Patent: Jan. 9, 2024

(54) ELECTRO-OPTICAL DEVICE FOR TAKING MEASUREMENTS OF FLOW

(71) Applicant: HORIBA ABX SAS, Montpellier (FR)

(72) Inventors: Philippe Genevaux, Montpellier (FR); Nelly Rongeat, Montpellier (FR)

(73) Assignee: HORIBA ABX SAS, Montpellier (FR)

( * ) Notice: Subject to any disclaimer, the term of this patent is extended or adjusted under 35 U.S.C. 154(b) by 0 days.

(21) Appl. No.: 17/793,177

(22) PCT Filed: Jan. 15, 2021

(86) PCT No.: PCT/FR2021/050077
§ 371 (c)(1),
(2) Date: Jul. 15, 2022

(87) PCT Pub. No.: WO2021/144545
PCT Pub. Date: Jul. 22, 2021

(65) Prior Publication Data
US 2023/0052921 A1    Feb. 16, 2023

(30) Foreign Application Priority Data

Jan. 17, 2020    (FR) ...................................... 2000487

(51) Int. Cl.
*G01N 15/14*    (2006.01)
*G01N 15/02*    (2006.01)

(52) U.S. Cl.
CPC ..... *G01N 15/1434* (2013.01); *G01N 15/0205* (2013.01); *G01N 15/1459* (2013.01); *G01N 2015/1486* (2013.01)

(58) Field of Classification Search
CPC ........... G01N 15/0205; G01N 15/1434; G01N 15/1436; G01N 15/1459; G01N 2015/1481; G01N 2015/1486
See application file for complete search history.

(56) References Cited

U.S. PATENT DOCUMENTS 5,138,181 A    8/1992  Lefevre et al.
7,724,371 B2   5/2010  Nerin et al.
(Continued)

FOREIGN PATENT DOCUMENTS

FR    2 971 337 A1    8/2012
WO    2006053960 A1   5/2006

*Primary Examiner* — Kevin K Pyo
(74) *Attorney, Agent, or Firm* — Volpe Koenig

(57) ABSTRACT

An electro-optical device for taking flow measurements includes a measurement tank through which a flow of fluid to be characterized flows, at least first and second guns for emitting light having separate spectra, a triggering gun allowing diffraction to be measured at small angles and a receiving gun allowing a measurement of attenuation and at least one fluorescence to be taken. The first emitting gun includes a light source defining a main optical axis perpendicular to the fluid flow, and the second emitting gun includes a second light source defining a secondary optical axis substantially orthogonal to the main optical axis and fluid flow. The first and second emitting guns are placed on one side of the measurement tank, the receiving gun is placed on the other side of the measurement tank along the main optical axis and the triggering gun is placed on the other side of the tank.

13 Claims, 2 Drawing Sheets

(56) References Cited

U.S. PATENT DOCUMENTS

2010/0297759 A1* 11/2010 Kanda ................ G01N 33/5005
  435/286.1
2013/0308122 A1   11/2013 Merchez et al.
2017/0343475 A1   11/2017 Yamada
2018/0348112 A1   12/2018 Nagai et al.

* cited by examiner

[Fig. 1]
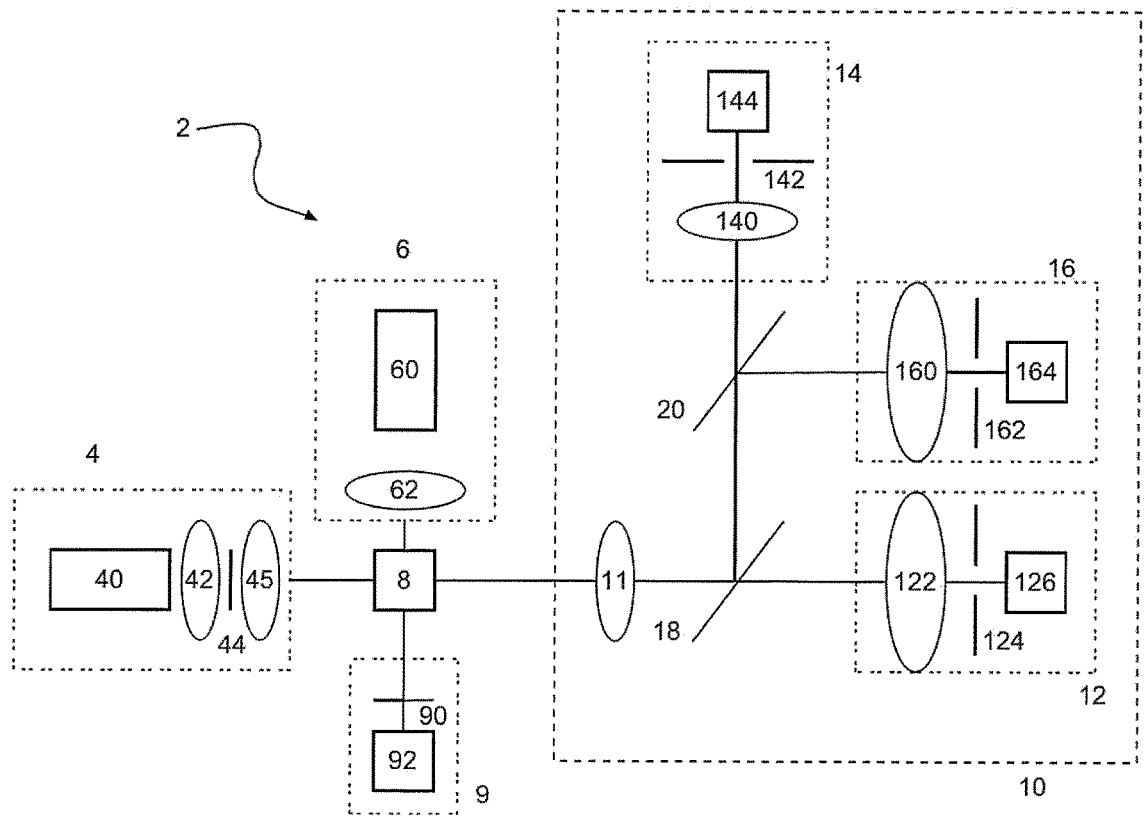
[Fig. 2]
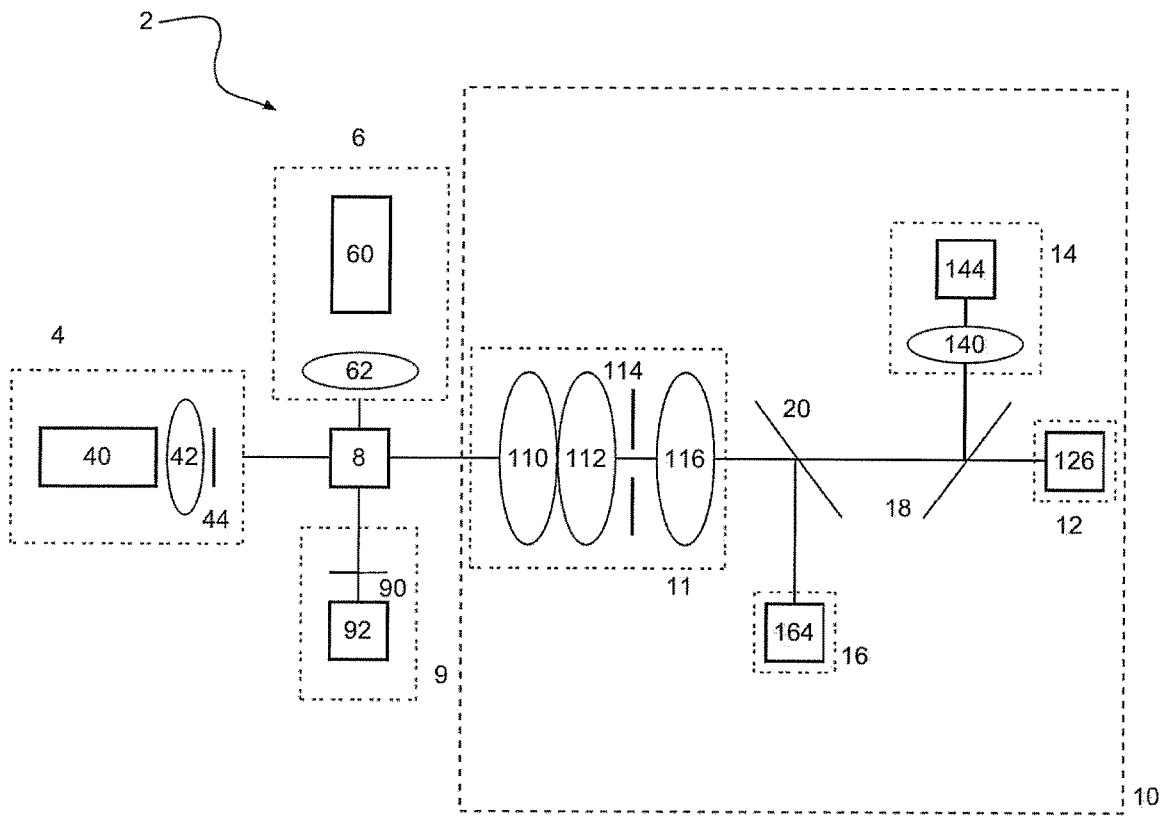

[Fig. 3]
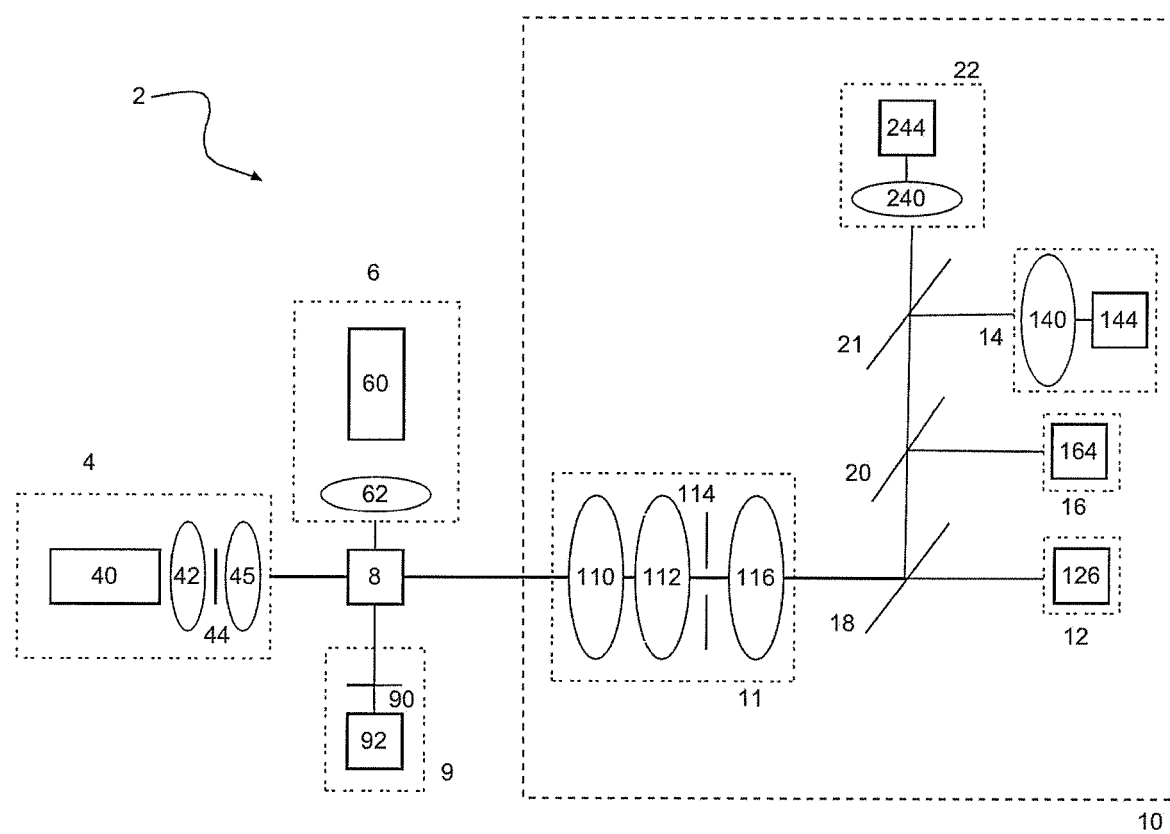

ELECTRO-OPTICAL DEVICE FOR TAKING MEASUREMENTS OF FLOW

FIELD OF THE INVENTION

The invention relates to the field of electro-optical devices for taking measurements of flow for characterizing microparticles, in particular biological cells, comprising a measurement chamber in which the flow of the fluid to be characterized circulates and containing the cells to be characterized. This field relies on the use of analysis methods based on the use of electrical and optical measurements for counting and differentiating the cells present in a sample to be analyzed.

The present invention relates more specifically to a multiparametric electro-optical device for cell counting and characterization. The fluid to be characterized is preferentially a blood sample, but it may also be a biological liquid of another nature of the following types: cerebrospinal liquid, urine, pleural liquid, synovial liquid, a cell suspension, bone marrow, etc. The sample may also contain particles of any nature (cells, proteins, biomarkers, etc.) that it will be necessary to differentiate and count.

More precisely, the invention relates to the devices comprising at least two light sources, a device for measuring resistivity or impedance and a plurality of detectors for measuring optical parameters, typically attenuation measurements, measurements of large-angle diffractions and fluorescence measurements.

BACKGROUND

These measurements allow the characterization and counting of the biological cells or particles present in the fluid.

The electrical impedance measurements make it possible to count particles and to obtain information on the sizes thereof.

The optical parameters (refraction, diffusion, absorption and flexion) make it possible to extract morphological information on the cells such as the shape, the volume, the size and the internal structure. Light sources (such as lasers, halogen sources or light emitting diodes) make it possible to generate a light that will be focused by lenses and illuminate the biological cells passing through a measurement tank. In contact with the biological cell, the light interacts with the cell. In the incident axis of the light beam, the light is collected by a plurality of lenses and can be filtered spatially by diaphragms in order to be detected by means of a photodiode detector. This measurement, in the range of angles selected, gives an indication on the size of the biological element combined with structure information. In addition, another measurement may be made in the incident axis of the light beam. The incident light is blocked by a stop (beam stopper) and the signals diffused by the cells are detected on a sensor of the photodiode type to generate the FSC (forward scatter) measurement. This measurement, in the range of angles selected, gives an indication on the size of the biological element and/or can serve to trigger the measurement for small particles. Another part of the light is collected orthogonally and passes through another set of lenses, and a set of semi-reflective mirrors, to be measured at a sensor for generating the SSC (size scatter) signal. This orthogonal light measurement gives an indication on the density of the biological element as well as on its granularity (structure) or on its intracellular content.

The measurement of the fluorescence is used for revealing fluorescent dyes used as cell markers or as molecular probes specific to a structure or to a function of the biological element. For example, if an antibody specific to a certain cell class is used, coupled to a fluorochrome, it is possible to reveal this cell class, i.e. to characterize the cell precisely and to count it. The use of a plurality of fluorescences simultaneously makes it possible to best characterize the biological cells of interest.

When the fluid is a blood sample, the representative elements of the blood that are the lines of the red corpuscles (or erythrocytes), white corpuscles (or leucocytes) and platelets (or thrombocytes) are determined quantitatively (counting) and qualitatively (formula). This analysis is called a hemogram or blood formula count (BFC). Abnormalities in the BFC can alert the doctor to latent pathologies (anemia, cancer, etc.).

All these cells come from one and the same strain cell located in the bone marrow, called hemocytoblast. These strain cells next differentiate into several sub-populations.

Thus, in the case of hematopoietic cells, a person skilled in the art knows that the analysis of the cell, obtained by impedance, diffraction or absorption, allows discrimination of the main cell lines including the erythrocytes or red corpuscles, the thrombocytes or platelets and the leucocytes or white corpuscles. The latter population is itself subdivided into several categories such as for example lymphocytes, monocytes, neutrophils, eosinophils and basophils. The blood is normally composed of mature cells that no longer divide.

The cell counting and differentiation can be implemented by simultaneously determining the volume and the apparent white-light attenuation as described in the patent U.S. Pat. No. 5,138,181 filed by the Applicant. A device developed in one embodiment in quasi-monochromatic light is for example described in the patent WO 2006/053960.

For each of the cell types mentioned above, the various maturation levels are known. Thus red corpuscles, also called erythrocytes, are first manufactured in the form of proerythroblasts, then basophilic erythroblasts, then polychromatophilic erythroblasts, which develop into acidophilic erythroblasts, and then into reticulocytes obtained after expulsion of the nucleus of the acidophilic erythroblast. It is these reticulocytes which, after total loss of the residual RNA, differentiate in the circulating blood into erythrocytes.

The white corpuscles or leucocytes come from the bone marrow in the prior form of myeloblasts, which will then give the progranulocytes that then transform into basophilic, eosinophilic or neutrophilic granulocytes, first non-segmented and then where the nuclei will more and more segment as they mature.

These myeloblasts also give rise to the monocyte line that will give the monoblasts, the promonocytes and then the monocytes that will pass through the peripheral blood.

The pluripotent strain cell to which the myeloblast gives rise also gives rise to the lymphocyte line by a differentiation in the form of a lymphoid strain cell a part of the line of which, the line of the T lymphocytes, will continue its maturation in the thymus and the ganglions and the other part will remain in the bone marrow in order to give the B lymphocyte line. These B lymphocytes, once activated in the form of plasmocytes, produce the antibodies for combating pathogenic antigens.

The blood platelets, or thrombocytes, for their part come from the megakaryoblasts, themselves coming from the myeloid progenitor to which the myeloblast gives rise, which, once arrived at the ultimate stage of their maturation, which are thrombocytogenic megakaryocytes, produce platelets by splitting of their cytoplasms. The other platelets, cross-linked platelets, contain an RNA load that is the remainder of their original cell.

Diagnosing some pathologies requires the finer and finer counting and characterization of the hematopoietic cells in the circulating blood. In particular, it becomes necessary to be able to reveal specific populations such as the reticulocytes and the erythroblasts, which are the immature versions of erythrocytes. Likewise, revealing immature cells, the precursors of leucocytes, called immature lymphocytes, monocytes or granulocytes, is of great importance. The classification and counting of the activated lymphocytes or of the cross-linked platelets would also make it possible to truly improve the diagnosis of patients.

The specific fluorescent marking of cells makes it possible to provide great specificity as well as the detection of immature or atypical cells. Thus the various types of lymphocyte can be characterized precisely and counted using specific antibodies coupled to a fluorochrome. Other cells abnormally encountered in the blood, such as for example atypical lymphocytes and precursor immature cells, can also be detected after fluorescence marking. Likewise, cross-linked platelets can be marked specifically by a fluorochrome.

In order to best differentiate each of the particulate populations contained in a sample, the Applicant proposed an electro-optical device for flow measurements in the patent application FR 2 971 337. This device has many advantages. Nevertheless, because of its configuration, this device is complicated to adjust and offers very limited access to the measurement tank.

The invention improves the situation.

SUMMARY

For this purpose, the invention proposes an electro-optical device for taking measurements of flow comprising a measurement tank through which a flow of fluid to be characterized flows, at least two guns for emitting light having separate spectra, a triggering gun allowing small-angle diffraction to be measured and a receiving gun allowing a measurement of attenuation and at least one fluorescence to be taken.

This electro-optical device is such that:
the first emitting gun comprises a light source having the center wavelength greater than 580 nm and defining a main optical axis perpendicular to the flow of fluid,
the second emitting gun comprising a second light source, having a center wavelength of less than 580 nm and defining a secondary optical axis substantially orthogonal to the main optical axis and to the flow of fluid,
the first emitting gun and the second emitting gun are disposed on one side of the measurement tank, the receiving gun is disposed on the other side of the measurement tank along the main optical axis, and the triggering gun is disposed on the other side of the measurement tank along the secondary optical axis,
the receiving gun comprises a detection channel for measuring the attenuation and at least one detection channel for measuring at least one fluorescence signal, as well as a single objective for collecting the beam coming from the interaction of the light beam between the first emitting gun and the second emitting gun and the particles in the flow of fluid, said collecting objective being arranged so that the light beam that it transmits is a beam substantially collimated along the main optical axis towards the detection channel for measuring the attenuation, the receiving gun forming a single mechanical unit at least a part of which is able to move with respect to the measurement tank, the receiving gun furthermore comprising a first dichroic mirror placed downstream of the collecting objective where the light beam is substantially collimated, arranged for partially transmitting the light beam resulting from the interaction between the first emitting gun and the particles in the flow of fluid towards the detection channel for measuring the attenuation, and for partially reflecting the light beam resulting from the interaction between the second emitting gun and the particles in the flow of fluid towards at least one detection channel for measuring at least one fluorescence signal.

This device is advantageous since it offers free access to the measurement tank, as well as easy adjustment by virtue of the production of the receiving gun in the form of a single mechanical unit. In addition, it offers increased robustness compared with the device of the patent application FR 2 971 337.

In various variants, the invention can have one or more of the following features:
the receiving gun comprises a detection channel for measuring the large-angle diffraction and a second dichroic mirror placed downstream of the collecting objective and arranged to partially reflect the light beam resulting from the interaction between the second emitting gun and the particles in the flow of fluid towards at least one from the at least one detection channel for measuring the fluorescence and the detection channel for measuring the large-angle diffraction,
the detection channel for measuring attenuation comprises a detector arranged for measuring a quantity of red light, the at least one detection channel for measuring at least one fluorescence comprising a detector arranged for measuring a quantity of green light and a quantity of orange light or near infrared, and the detection channel for measuring large-angle diffraction comprises a detector arranged for measuring a quantity of blue light,
the detector arranged for measuring a quantity of red light is a photodiode, the detector arranged for measuring a quantity of green light is a photomultiplier or a silicon photomultiplier, and the photodetector arranged for measuring a quantity of blue light is a photodiode,
the receiving gun is in a single piece and is able to move integrally with respect to the measurement tank,
the second dichroic mirror is placed downstream of the first dichroic mirror in the path of the reflected beam and is arranged for partially reflecting the latter towards the detection channel to measure the fluorescence and to partially transmit it to the detection channel to measure the large-angle diffraction,
the detection channel for measuring attenuation, one or more detection channels for measuring one or more fluorescence signals and the detection channel for measuring large-angle diffraction each comprise an optic followed by a diaphragm upstream of their respective detector,
the collecting objective comprises two lenses, one of which is able to move with respect to the measurement tank, the remainder of the receiving gun not having mobility with respect to the measurement tank, and a diaphragm disposed downstream of the two lenses,
the second dichroic mirror is placed upstream of the first dichroic mirror in the path of the reflected beam and is arranged for partially reflecting the latter towards the detection channel to measure the large-angle diffraction and to partially transmit it to the first dichroic mirror, the first emitting gun comprises a first emission source that is a red LED, the second emitting gun comprises a second emission source that is a blue laser, the device furthermore comprises one or more adjustment elements arranged for allowing the adjustment of the device by moving all or part of the receiving gun and measurement in the detection channel, and the device furthermore comprises one or more mirrors arranged for offsetting one or more substantially collimated beams.

BRIEF DESCRIPTION OF THE DRAWINGS

Other features and advantages of the invention will emerge more clearly from the reading of the following description, derived from examples given by way of illustration and non-limitatively, derived from the drawings on which:

FIG. 1 shows a first embodiment of a device according to the invention,

FIG. 2 shows a second embodiment of a device according to the invention,

FIG. 3 shows a third embodiment of a device according to the invention.

The drawings and the following description contain essentially elements of a certain character. They can therefore not only serve to give a best understanding of the present invention but also contribute to the definition thereof, where applicable.

DETAILED DESCRIPTION OF THE PREFERRED EMBODIMENTS

FIG. 1 shows a first embodiment of a device according to the invention.

The device 2 comprises a first emitting gun 4 and a second emitting gun 6 disposed on one side of a measurement tank 8, a triggering gun 9 and a receiving gun 10 disposed on the other side of the measurement tank 8. The receiving gun 10 comprises a collecting objective 11, three detection channels referenced 12, 14 and 16, as well as dichroic mirrors 18 and 20 described below for separating the light beam propagating in the measurement tank 8 into a plurality of light beams having different wavelengths (in the example described here red, blue, green) and specific to each of the three detection channels 12, 14 and 16. The detection channel 12 is used for measuring attenuation, the detection channel 14 is used for measuring fluorescence, and the detection channel 16 is used for measuring 90° diffraction (also called SSC).

In the example described here, the first emitting gun 4 comprises a first emission source 40, a shaping optic 42 and a reticle 44 and a focusing optic 45 that serves to reduce the size of the rectangle coming from the reticle 44 that is projected onto the measurement tank 8.

The first emission source 40 is in the example described here an Epitex SMB660NR-1100 red LED and has an intensity distribution similar to that of a Lambertian source, making it possible to obtain the required uniformity. The emission spectrum of the LED 40 is wide and centered on 660 nm. The chip of the LED 40 has an active surface area of 1.1 mm2. The optical power delivered by the LED 40 at the output of the first emitting gun 4, i.e. at the center of the measurement tank 8, is 45 µW. In general terms, this first emission source has an emission spectrum with a center wavelength greater than 580 nm. Conversely, as will be seen below, the second emission source has an emission spectrum with a center wavelength of less than 580 nm. This dichotomy is implemented in order to be able to separate a measurement in the red and a measurement in the blue or green.

The shaping optic 42 comprises, in the example described here, two collection lenses located between the LED 40 and the reticle 44. These two lenses project the aperture diaphragm, which makes it possible to ensure the uniformity of the beam illuminating the flow of biological cells propagating in the measurement tank 8. To take account of the fact that the spectrum of the LED 40 covers a part of the fluorescence emission spectrum of thiazole orange, and to limit the resulting noise on the detection channel 14 measuring the fluorescence, a colored or interference filter can optionally be placed between the two lenses of the shaping optic 42, where the light beams are collimated. This makes it possible to cut the green component of the LED 40.

The reticle 44 is in the example described here rectangular in shape (150×500 µm2). Thus, in combination with the LED 40 and the shaping optic 42, the paraxial magnification of the system as far as the cells is 0.172. The paraxial image of the reticle 44 on the flow of cells is therefore a rectangle of 86 µm×25.8 µm (respectively 500 µm×0.172 and 150 µm×0.172). Moreover, simulation on Zemax shows that a perfect "real" system (limited by diffraction) should give a spot of 90 µm×28.8 µm (the size obtained with Zemax Cross X and cross Y at the curve toe). The experimental measurements of the dimensions of the image are very similar to those produced by a perfect "real" system.

At the level of the measurement tank (8), the beam coming from a point of the LED 40 (corresponding to the image of the LED 40 and without reticle) is collimated, which means that the aperture diaphragm is projected to infinity. This was designed by making its image coincide with the focal point of the system.

The first emitting gun 4 makes it possible, with the detection gun 12, to measure the attenuation of an LED beam around 660 nm by biological cells in movement. This measurement is improved by means of the precise control of the form of the beam and of the uniformity of the illumination at the cells.

In the example described here, the detection gun 12 for measuring the attenuation is located downstream of the dichroic mirror 18 of the reception channel 10, and comprises a focusing lens 122, a diaphragm 124 and a detector 126.

In the example described here, the dichroic mirror 18 is a Semrock FF605-Di02 filter, which transmits to the detection channel 12 the part of the beam collimated by the collecting objective 11, which has a wavelength greater than 605 nm, while the other part of the beam collimated by the collecting objective 11, which has a wavelength below 605 nm, is reflected towards the detection channel 14 and the detection channel 16. The dichroic mirror 18 described here transmits 98% of the red while it reflects 99% of the blue and green. In accordance with the specifications of the dichroic mirror 18, the collecting objective 11 collimates the beam coming from the measurement tank 8, so that it arrives on the filter 18 with a half-angle of less than 2□.

In the example described here, the bandpass filter 120 is a Semrock FF01-655/40 bandpass interference filter that makes it possible to transmit only the red wavelengths (from 635 nm to 675 nm) coming from the LED 40. In the example described here, the focusing lens 122 focuses the light beam in the diaphragm 124, which measures 1 mm in diameter and is positioned at 22 mm from it. In the example described here the focusing lens 122 is a model produced to order. This planoconvex lens has a radius of curvature of 12.42 mm made from N-BK7 material. Nevertheless, other lenses can be used. Finally, the detector 126 of the example described here is a Hamamatsu S1223 photodiode located at 6.75 mm from the diaphragm 124 and therefore from the focal point. The half-angle of the beam entering the detection channel 12 is less than the 7□ prescribed for the bandpass filter 120, and the numerical aperture of this beam emerging from the measurement tank is limited to 0.31 by virtue of the diaphragm in the reception gun 12.

In the example described here, the second emitting gun 6 comprises a second emission source 60, and a shaping optic 62.

The second emission source 60 is in the example described here a blue laser source that comprises a laser diode with a power of 50 mW emitting at 488 nm made by Osram, the output of which is shaped by anamorphic lenses so that the beam is elliptical at the output of the laser source 60.

The shaping optic 62 comprises, in the example described here, a spherical lens with a focal length of 75 mm, for example a Thorlabs AC127-075-A pair. Having a lens with a fairly long focal length makes it possible to have a greater depth of field at the interaction between biological cells and light beam. The ellipse then has a size of approximately 200 μm×30 μm (at 1/e2) in the measurement tank and a vertical polarization.

The laser source 60 has the advantage of being at the focal point in the cell flow of the measurement tank 8, which makes it possible to obtain a superior beam quality and better reproducibility. In addition, this makes it possible to obtain high tolerances on the lateral and longitudinal positioning. This is because the lateral positioning is favored by virtue of the length of the laser beam in the measurement tank (flattened ellipse), and the longitudinal tolerance depends on the distance between laser and measurement tank.

The laser source 60 is used by the fluorescence-measuring detection channel 14, and by the detection channel 16 for measuring 90° diffraction. These two detection channels treat the part of the beam collimated by the collecting objective 11 that has a wavelength of less than 605 nm and is reflected by the dichroic mirror 18. The dichroic mirror 20 is placed downstream of the dichroic mirror 18 in the path of the beam used for separating this beam in two. In the example described here, the mirror 20 is a Semrock FF506-Di03 filter that reflects the wavelengths below 506 nm and transmits the wavelengths higher than 506 nm.

Thus the detection channel 14 for measuring fluorescence measures wavelengths in the green coming from the fluorescence of the thiazole orange marking the nucleic acids of the biological cells. Thus the detection channel 14 is disposed in the axis of the beam reflected by the dichroic mirror 18. The detection channel 14 comprises a pair of lenses 140, a diaphragm 142 and a detector 144. The pair of lenses 140 makes it possible to focus the beam transmitted by the dichroic mirror 20 in the diaphragm 142, which has a diameter of 1.5 mm. The diaphragm 142 provides the spatial filtering and makes it possible to obtain a high signal to noise ratio. The fluorescence signal is next measured by the detector 144, which is in the example described here a Hamamatsu H10723 photomultiplier. The numerical aperture of the detection channel 14 is 0.6.

The part of the beam that is reflected by the dichroic mirror 20 is directed towards the detection channel 16 for the measurement of 90□ diffraction coming from the interaction between laser and biological cells in the blue.

The detection channel 16 comprises in the example described here a focusing lens 160, a diaphragm 162 and a detector 164. The focusing lens 160 is in the example described here a Thorlabs LA-1270-A reference lens and the diaphragm 162 has a diameter of 1.5 mm, while the photodiode 164 is a Hamamatsu S1223 photodiode. Here again, the diaphragm 162 provides the spatial filtering and makes it possible to obtain a high signal to noise ratio.

As mentioned above, the collecting objective 11 downstream of the measurement tank 8 is common to the detection channels 12, 14 and 16. In the example described here, the collecting objective 11 has a fairly large numerical aperture of 0.6, in order to collect a maximum flow emitted from the measurement tank 8. The focusing distance of this objective is selected to be sufficiently great to be able to facilitate access to the measurement tank (the distance between the measurement tank and the pair being 5.2 mm in the example described here). In the example described here, the collecting objective 11 is a pair of lenses that also makes it possible to limit the chromatic aberrations since the wavelengths present are various (from 488 nm to 700 nm).

The receiving gun 10 is adjusted with a diaphragm with a diameter of 0.3 mm (not shown on FIG. 1), which is introduced in place of the diaphragm 124 of the detection gun 12. The use of a diaphragm with a small diameter (0.3 mm) makes it possible to have high precision of adjustment. The optimum position of the receiving gun 10 corresponds to the maximum intensity detected by the photodiode 126. To do this, the position of the measurement tank 8 with respect to the receiving gun 10 is adjusted in the three axes by means of a device for moving the mechanical unit that receives all the elements of the reception channel 10. This makes it possible to adjust the three detectors with a single precise adjustment. This adjustment is simplified since it uses the same detector as the attenuation detector 126. This avoids having to use bulky equipment such as for example a camera, this is particularly advantageous for persons in after-sales service.

Optionally, bandpass filters dedicated to attenuation 120 (red), to 90° diffraction (SSC) (blue) and to fluorescence (green) have a respective transmission of 85%, 90% and 96% can be added in the respective detection channels 12, 14 and 16. Thus, because of the characteristics of the dichroic mirrors 18 and 20, for a reflection of 1% on the interfaces of the lenses, the transmission is 78% in attenuation, 83% in diffraction and 86% in fluorescence.

In attenuation, the percentage of parasitic light is $2.10^{-6}$% in the blue and in the green. In 90° diffraction, this percentage is $2.10^{-6}$% in the red and $9.10^{-3}$% in the green. Since the fluorescence signal is weak, the gain of the photomultiplier 144 is very high, and it is for this reason that it is important to take account of the parasitic light in this channel, in particular of the blue related to the laser, it is $3.10^{-4}$% in the blue and in the red.

The triggering channel 9 comprises a beam blocker 90 and a detector 92. The signal detection in the axis at 488 nm is used in the example described here as a trigger signal. The triggering channel 9 comprises a beam blocker for eliminating the incident beam of the laser. The beam blocker is in the example described here a vertical bar with a width of 0.8 mm located at 5.5 mm from the measurement tank 8 in the axis of the laser source 60. The width thereof is sufficient for blocking the laser beam of the source 60, the size of which on the horizontal axis is fairly stable and remains below 300 µm. The detector 92 is, in the example described here, a Hamamatsu S1223 that makes it possible to make a small-angle diffraction measurement (also referred to as FSC).

The clinical studies of the Applicant demonstrated that this device allows a leucocyte differential: the LMNEs (lymphocyte, monocyte, neutrophil, eosinophils), Baso (basophils), IG (immature granular), LYA (atypical lymphocytes), HRC (high RNA content), ERB (erythroblasts). The device makes it possible to distinguish erythrocytes and 3 maturation indices of reticulocytes, and platelets.

In addition, this device, with its single-piece receiving gun 10, is appreciably easier to adjust than the known devices, while offering much greater access to the measurement tank 8, which greatly facilitates maintenance thereof, and therefore both maintenance of quality of measurements over the long term and optimization of the cost of using same.

The device shown on FIG. 2 shows a second embodiment wherein the concept of the single-piece receiving gun has been pushed even further in order to further simplify the adjustment procedure and to reduce the costs of producing the device.

In this embodiment, the first emitting gun 4, the measurement tank 8 and the triggering gun 9 are identical to the device described in FIG. 1.

The second emission gun 6 differs in that the laser source 60 is in the example described here a laser diode with a power of 10 mW. The low power of 10 mW makes it possible not to have any thermal regulation by Peltier effect, thus making it possible to reduce the size and costs. Nevertheless, in order to increase the power density, the height of the light beam in the measurement tank is reduced. The light beam of the laser diode is shaped by the anamorphic lenses so that the beam is elliptical at the output of the laser. The light beam is focused on the flow of biological cells in the measurement tank 8 by means of the same shaping optic 62.

As will be seen below, in order to limit the movable part of the device to a single lens, the detection channels 12, 14 and 16 have a common axis that comprises the dichroic filters 18 and 20, the dichroic filter 20 being placed upstream of the dichroic filter 18 to keep the detection channel 12 in the axis of the first emission source 4. By means of the design of the collecting objective 11, the size of the dichroic filters 18 and 20 is less than that of the dichroic filters of the first embodiment, which constitutes a significant source of economy as well as a miniaturization of the optical system, which is thus more compact. In addition, since the adjustment is done via the detection channel 12, bringing the detector 144 closer to the detector 124 makes it possible to be more precise on the position of the light beam on the detector 144. The dichroic filter 18 is unchanged and the dichroic filter 20 is here a Semrock FF518-Di01 filter, the separation wavelength of which is 518 nm. Thus the blue radiation is sent to the detection channel 16, the green radiation to the detection channel 14, and the red radiation to the detection channel 12.

Because of the reduction in size of the beam, the attenuation detection channel 12 is simplified so as to comprise only the photodiode 126. Optionally, a focusing lens and/or a bandpass filter substantially centered on the emission wavelength of the emission source 40 can be provided.

Likewise, the fluorescence detection channel 14 is simplified so as to comprise only a Semrock FF01-550/49 interferential filter (optional and not shown) at the input followed by a focusing lens 140 that focuses the beam on the photomultiplier 144, which is here simplified as a silicon photomultiplier (SiPM).

Because of the reduction in size of the beam, the 90° diffraction detection channel 16 is simplified so as to comprise only the photodiode 164. Optionally, a focusing lens and/or a bandpass filter centered on the detection wavelength (for example a Semrock FF01-482/35 filter) can be provided.

Since the dichroic mirrors 18 and 20 and the bandpass filters are secured to the same mechanical part (i.e. the receiving gun 10, apart from the movable lens 112), the precision is increased. Indeed, the angle of the dichroic filter is better controlled and the tolerances are smaller.

As mentioned above, the main change in this embodiment lies in the collecting objective 11, which is here implemented in the form of two lenses 110 and 112 downstream of the measurement tank 8, in proximity to the latter and in the emission axis of the first emission channel 4, a diaphragm 114, and a lens 116 placed downstream of the diaphragm 114 so that the latter is at its focal plane.

The lens 110 has a high numerical aperture (here 0.6) and a large diameter (25.4 mm). Its focal length is fairly great to allow space between the measurement tank and the lens 110. This facilitates access to the measurement tank, the center of the first surface of the lens 110 being located at 4.6 mm from the measurement tank 8. The lens 110 is in the example described an aspherical lens, which makes it possible to limit spherical aberrations.

The lens 112 next focuses the light beam at the diaphragm 114, which provides spatial filtering, and the beam thus filtered is reflected to infinity by the 6 mm diameter lens 116. The diaphragm 114 has in the example described here a diameter of 1.5 mm. The lens 112 makes it possible to reduce the size of the light beam so as to obtain a more compact optical system and to reduce the price of the optical elements.

The focusing of the beam after the lenses 110 and 112 makes it possible to implement a spatial filtering while reducing the size of the light beam. The filters and detectors of the rest of the device can thus be selected with smaller sizes than before and the engineering is thus more compact. The great focal length and diameter of the objective make it possible to move away from the measurement tank 8 and thus to facilitate access thereto, in particular for replacement thereof.

This implementation of the collecting objective 11 is furthermore highly advantageous since it allows an even more simple and reliable adjustment than in the first embodiment. This is because, unlike the case of the first embodiment where it was necessary to move the whole of the receiving gun 10 with respect to the measurement tank 8, in the case of the second embodiment it is necessary to move only the lens 112, which has been made movable. To make the adjustment, the photodiode 126 of the detection channel 12 is removed to introduce an adjustment tool comprising a focusing lens, a diaphragm with a diameter of 0.3 mm and a thickness of 1 mm placed at the focal plane of the focusing lens, and the photodiode is put back in place. As the diameter of the diaphragm is very small, there is only one operating point when the adjustment is made, which corresponds to the maximum intensity measured on the photodiode. To do this, the position of the lens 112 with respect to the diaphragm 114 is adjusted in the three axes. In addition, as the photodiode 126 constitutes the electronics used for making the adjustment, it is reliable and simple to use. Adding the adjustment tool also makes it possible to have a more compact and optical bench.

The device implemented in this second embodiment is more compact and less expensive to produce than the first embodiment. It does nevertheless have the same advantages of accessibility of the measurement tank, and especially the mechanical design thereof is appreciably simplified since the lens 112 is the only moving part of the device.

The device shown in FIG. 3 represents a third embodiment in which two fluorescence signals are measured. While adding a measurement, the concept of the single-piece receiving gun is still fundamental.

In this embodiment, the first emitting gun 4, the measurement tank 8 and the triggering gun 9 are identical to those of the devices of FIGS. 1 and 2. The emitting gun 6 can be either identical to that of the device of FIG. 1 or be identical to that of the device of FIG. 2. This choice may depend on the light energy necessary in the measurement tank, for example according to the antibodies and fluorochrome used.

In this embodiment, the objective 11 and the adjustment of the receiving gun are identical to those of the device of FIG. 2.

The dichroic filter 18 is unchanged, the dichroic filter 20 is here a Semrock FF500-Di01 filter the separation wavelength of which is 500 nm. In this configuration, a dichroic filter is added, the Semrock FF555-Di03 filter the separation wavelength of which is centered on 555 nm. Thus the blue radiation is sent to the detection channel 16, the green radiation to the detection channel 14, the yellow radiation to the detection channel 22 and the red radiation to the detection channel 12.

The attenuation detection channel 12, the objective 11, the 90° diffraction detection channel 16 and the adjustment of the optical bench are identical to those of the device of FIG. 2. With regard to the fluorescence detection channel 14, this is identical to that of FIG. 2, except in that the detector used is a photomultiplier or a silicon photomultiplier (SiPM).

The device furthermore comprises a fluorescence detection channel 22 that comprises an FF01-585/40 interference filter (optional and not shown) at the input followed by a focusing lens 240 identical to the lens 140 that focuses the beam onto the photomultiplier or onto a silicon photomultiplier (SiPM) 244.

Configurations were described above with respect to parts the precise references of which have been provided. It goes without saying that the invention is not limited to these parts solely, and that other comparable elements could be used that a person skilled in the art would be able to select and adapt where applicable, in relation to the wavelengths of the lasers, the filters, the optics, objectives or lenses and the detectors. In addition, the triggering gun could also be used to make the diffraction measurement in the axis for making measurements on the size. It must also be noted that the embodiments described above make it possible to use the two emission channels together, which makes it possible to make all the measurements simultaneously. This makes it possible to obtain a system wherein the measurement rate is higher. In a variant, the emitting guns could be activated sequentially. In addition, in the above and in the claims, the beam can be offset subsequently by one or more mirrors, in particular when it is mentioned that a beam is substantially collimated along an axis.

The invention claimed is:

1. Electro-optical device for taking measurements of flow, comprising a measurement tank (8) through which a flow of fluid to be characterized flows, at least first and second guns (4, 6) for emitting light having separate spectra, a triggering gun (9) allowing small-angle diffraction to be measured and a receiving gun (10) allowing a measurement of attenuation and at least one fluorescence to be taken, wherein:
the first emitting gun (4) comprises a light source (40) having a center wavelength greater than 580 nm and defining a main optical axis perpendicular to the flow of fluid,
the second emitting gun (6) comprising a second light source (60), having a center wavelength of less than 580 nm and defining a secondary optical axis substantially orthogonal to the main optical axis and to the flow of fluid,
the first emitting gun (4) and the second emitting gun (6) are disposed on one side of the measurement tank (8), the receiving gun (10) is disposed on the other side of the measurement tank (8) along the main optical axis, and the triggering gun (9) is disposed on the other side of the measurement tank (8) along the secondary optical axis,
the receiving gun (10) comprises a detection channel (12) for measuring the attenuation and at least one detection channel (14) for measuring at least one fluorescence signal, as well as a single objective (11) for collecting the beam coming from the interaction of the light beam between the first emitting gun (4) and the second emitting gun (6) and the particles in the flow of fluid, said collecting objective (11) being arranged so that the light beam that it transmits is a beam substantially collimated along the main optical axis towards the detection channel (12) for measuring the attenuation, the receiving gun (10) forming a single mechanical unit at least a part of which is able to move with respect to the measurement tank (8),
the receiving gun (10) further comprising a first dichroic mirror (18) placed downstream of the collecting objective (11) where the light beam is substantially collimated, arranged for partially transmitting the light beam resulting from the interaction between the first emitting gun (4) and the particles in the flow of fluid towards the detection channel (12) for measuring the attenuation, and for partially reflecting the light beam resulting from the interaction between the second emitting gun (6) and the particles in the flow of fluid towards the at least one detection channel (14) for measuring at least one fluorescence signal.

2. The electro-optical device for taking measurements of flow according to claim 1, wherein the receiving gun (10) comprises a detection channel (16) for measuring the large-angle diffraction and a second dichroic mirror (20) placed downstream of the collecting objective (11) and arranged to partially reflect the light beam resulting from the interaction between the second emitting gun (6) and the particles in the flow of fluid towards at least one from the at least one detection channel (14) for measuring the fluorescence and the detection channel (16) for measuring the large-angle diffraction.

3. The electro-optical device according to claim 1, wherein the detection channel (12) for measuring attenuation comprises a detector (126) arranged for measuring a quantity of red light, the at least one detection channel (14) for measuring at least one fluorescence comprising a detector (144) arranged for measuring a quantity of green light and a quantity of orange light or near infrared, and the detection channel (16) for measuring large-angle diffraction comprises a detector (164) arranged for measuring a quantity of blue light.

4. The electro-optical device for taking measurements of flow according to claim 3, wherein the detector (126) arranged for measuring a quantity of red light is a photodiode, the detector (144) arranged for measuring a quantity of green light is a photomultiplier or a silicon photomultiplier, and the photodetector (164) arranged for measuring a quantity of blue light is a photodiode.

5. The electro-optical device for taking measurements of flow according to claim 1, wherein the receiving gun (10) is in a single piece and is able to move integrally with respect to the measurement tank (8).

6. The electro-optical device for taking measurements of flow according to claim 5, wherein a second dichroic mirror (20) is placed downstream of the first dichroic mirror (18) in the path of the reflected beam and is arranged for partially reflecting the latter towards the detection channel (14) to measure the fluorescence and to partially transmit the fluorescence to the detection channel (16) to measure the large-angle diffraction.

7. The electro-optical device for taking measurements of flow according to claim 6, wherein the detection channel (12) for measuring attenuation, one or more detection channels (14) for measuring one or more fluorescence signals and the detection channel (16) for measuring large-angle diffraction each comprise an optic (122, 140, 160) followed by a diaphragm (124, 142, 162) upstream of their respective detector (126, 144, 164).

8. The electro-optical device for taking measurements of flow according to claim 1, wherein the collecting objective (11) comprises two lenses (110, 112), one of which is able to move with respect to the measurement tank (8), a remainder of the receiving gun (10) not having mobility with respect to the measurement tank (8), and a diaphragm (114) disposed downstream of the two lenses (110, 112).

9. The electro-optical device for taking measurements of flow according to claim 8, wherein a second dichroic mirror (20) is placed upstream of the first dichroic mirror (18) in the path of the reflected beam and is arranged for partially reflecting the the reflected beam towards the detection channel (16) to measure the large-angle diffraction and to partially transmit the reflected beam to the first dichroic mirror (18).

10. The electro-optical device for taking measurements of flow according to claim 1, wherein the first emitting gun (4) comprises a first emission source (42) that is a red LED.

11. The electro-optical device for taking measurements of flow according to claim 1, wherein the second emitting gun (6) comprises a second emission source (62) that is a blue laser.

12. The electro-optical device for taking measurements of flow according to claim 1, further comprising one or more adjustment element arranged for allowing adjustment of the device by moving all or part of the receiving gun (12) and measurement in the detection channel (16).

13. The electro-optical device for taking measurements of flow according to claim 1, further comprising one or more mirrors arranged for offsetting one or more substantially collimated beams.

* * * * *